United States Patent Office 3,775,295
Patented Nov. 27, 1973

3,775,295
METHOD FOR THE DECOMPOSITION OF ADDUCTS OF UREA AND n-PARAFFINS
Hermann Franz, Neu Isenburg, and Max Kunert, Neu Wulmstorf, Germany, assignors to Edeleanu Gesellschaft m.b.H., Frankfurt am Main, Germany
No Drawing. Filed July 29, 1970, Ser. No. 59,343
Claims priority, application Germany, Sept. 11, 1969, P 19 45 902
Int. Cl. C07b 21/00; C10g 43/00
U.S. Cl. 208—25
7 Claims

ABSTRACT OF THE DISCLOSURE

An adduct of urea and n-paraffin is decomposed by heating a mixture of adduct, water and solvent in a closed vessel to decomposition temperature until the adduct decomposes and maintaining the mixture at this temperature until it separates into a first layer comprising n-paraffin and solvent and a second layer comprising an aqueous solution of urea. Lower decomposition temperatures than employed heretofore are achieved and the resultant aqueous solution of urea may be employed for further adduct formation without requiring a concentration step.

BACKGROUND OF THE INVENTION

This invention relates to the decomposition of adducts of urea and normal paraffins. More particularly, it relates to the decomposition of urea-n-paraffin adducts at substantially lower temperatures than were required heretofore and without the necessity of adding large quantities of water which heretofore have necessitated that the aqueous urea solutions be concentrated before they could be recycled for further adduct formation.

Adducts from urea and n-paraffins, called hereinafter "adducts," are produced by well-known urea dewaxing processes for the recovery of n-paraffins from hydrocarbon mixtures. Depending on the type of the process the adducts are formed either as pure crystalline granular substances comprising only urea and n-paraffins, or as granules enclosing water or another solvent or both. Water-wetted and solvent-wetted adducts also occur. n-Paraffins are recovered and urea is reclaimed by decomposition of these adducts.

Adducts are known to decompose when heated. In the case of anhydrous adducts the decomposition temperature is known to be lowered by adding water during the heating. It is also known that with aqueous adducts the higher the water content the lower the decomposition temperature. The decomposition step of known urea dewaxing processes requires either excessively high decomposition temperatures or the addition of large quantities of water. Very high decomposition temperatures result in a loss of urea by splitting off ammonia and carbon dioxide or by other side-reactions such as the formation of biuret. Large quantities of water in the adduct mass being subjected to decomposition are also a disadvantage because the aqueous urea solution formed during decomposition is dilute and thus not useful for another adduct-forming step. The concentration of the solution must, therefore, be increased by evaporation of the excess water before the solution is used again for adduct formation. There is another disadvantage in known urea dewaxing processes—the decomposition temperature depends, not only on the amount of water present but also on the chain length of the n-paraffin in the adduct. The decomposition temperature increases with increasing chain length. This causes difficulties in a continuous urea dewaxing process for the recovery of n-paraffins from hydrocarbon mixtures, having varying n-paraffin contents.

It is an object of this invention to develop a process for the decomposition of adducts in which the decomposition temperature is maintained at such a low level, that no loss of urea can occur through side-reactions and the concentration of the aqueous urea solution formed is sufficiently high to dispense with an evaporation step to increase the concentration of the solution. It is another object of this invention to develop a process in which the decomposition temperature does not depend significantly on the chain length of the n-paraffins contained in the adduct, thereby making the process an advantageous method for dewaxing hydrocarbon mixtures of widely varying compositions.

SUMMARY OF THE INVENTION

This invention achieves these objectives by heating a mixture of adduct, water and a hydrocarbon solvent, which is a solvent for n-paraffins but is immiscible with water and does not form an adduct with urea to a significant degree, in a closed vessel until the adduct decomposes and the vessel contents separate into two layers. In this manner, a lower decomposition temperature may be employed than was used heretofore.

DESCRIPTION OF THE PREFERRED EMBODIMENTS

In accordance with the present invention an adduct of urea and n-paraffins is decomposed by combining the adduct with appropriate quantities of water and a solvent in a closed vessel, and heating the mixture until the adduct decomposes and the entire mixture separates into two layers—the upper one comprising n-paraffins and solvent and the lower one comprising an aqueous solution of urea. It is advantageous to agitate the mixture during the heating and up until the point where the adduct decomposes. Mixing is, of course, undesirable while the mixture is separating into layers.

By keeping the vessel closed during the heating, no material in the vessel can escape before the vessel contents separate into layers. This is particularly true in the case of volatile components which, at decomposition temperature, cannot be prevented from escaping from the vessel even if a reflux condenser is used. If the reflux condenser is too small in size they will escape. Even if it is sufficiently large a considerable portion of these volatile components will be constantly retained in the reflux condenser thereby being separated from the vessel contents. By "volatile components" we mean principally azeotropes derived from water and the solvent and having a lower boiling point than water, irrespective of the boiling point of the solvent. Since the preferred solvents, low molecular weight hydrocarbons and low molecular weight hydrocarbon chlorides, have lower boiling points than water the boiling point of the azeotropes of these solvents and water is always below the boiling point of the solvents.

Due to the fact that no component of the vessel contents can escape during the heating period, the pressure rises in the decomposition vessel and the solvent is heated above its atmospheric boiling point. As a result of the pressure increase and the heating of the solvent above its normal boiling point, the decomposition temperature of the adducts is lowered.

By carrying on the heating beyond the point of decomposition to the point where the vessel contents separate into layers, the re-forming of urea-n-paraffin adducts is prevented.

Useful solvents which may be employed in this process include low molecular weight aliphatic branched chain alcohols, cyclic alcohols, ethers, ketones, hydrocarbons and aliphatic chlorides as well as some aromatics and naphthenes. Those particularly useful include isohexanol, cyclohexanol, diethyl ether, butanone, isopentane, isohexane, dichloromethane, dichloroethane, benzene and methylcyclopentane with the low molecular weight hydrocarbons and aliphatic chlorides being particularly preferred.

Vessels used in this process are equipped with heating facilities. In a preferred embodiment the process is conducted in a single vessel divided into two sections, one of which is equipped with an agitator. The adduct is decomposed in the agitated section. In the first section the contents are heated while being agitated until the adduct has decomposed. Then the contents are transferred into the second section and kept at temperature until they separate into layers. The decomposition temperature is maintained throughout the vessel interior, i.e., in both sections of the vessel, at least until the contents have separated into layers.

In another embodiment, the process is conducted in two separate vessels connected to each other. Both vessels may be closed or open one toward the other, if desired, but they are treated like a single vessel as far as temperature control is concerned. Preferably, the first or decomposition vessel is equipped with an agitator.

Conducting the process in two vessels creates the following situation. First, after the mixture of adduct, water and solvent is introduced into the first vessel, it remains closed to the outside from the initiation of heating to beyond the point of adduct decomposition and until the vessel contents are transferred to the second vessel. By the term "outside" we mean any space not belonging to the inside of said first vessel and into which substantial amounts of any component forming the contents of the first vessel could escape. Accordingly, the inside of the second vessel may be termed "outside," insofar as it is not filled. Secondly, as long as the material in the second vessel has not separated completely into layers, the second vessel is closed to the outside, and the decomposition temperature maintained therein. The term "outside" has the same meaning here as with respect to the first vessel. Accordingly the first vessel may be termed "outside" the second vessel. The material in the first vessel is transferred to the second vessel by means of conduits which are kept at the decomposition temperature during the transfer.

The process of the invention may be conducted batchwise. The vessel, i.e. the first section of the vessel or the first vessel of the two vessel system, is filled with adduct, water, and solvent. Water and solvent may be fed enclosed in the adduct, mixed therewith, or separately. Generally, the water is in the form of an aqueous urea solution. The vessel is closed off from the outside, and its contents heated while being agitated until it reaches decomposition temperature. On completion of the decomposition and termination of agitation, the vessel contents are left to settle, until phase separation has taken place. If a two vessel system is employed the product mixture derived from decomposition is transferred from the decomposition vessel into the second vessel connected therewith, wherein the separation of layers takes place. Up to this point the vessel contents are maintained at the decomposition temperature. After layer separation re-adducting is no longer possible. The layers are drawn off separately, and the process is resumed by charging adduct, water or aqueous urea solution and solvent into the first section of the vessel or into the first vessel of the two vessel system.

Certain proportions of adduct:water:solvent have been found useful. The ratio of adduct to water should be 100 parts by weight of adduct to 26 to 34 parts by weight of water, preferably 26 to 28 parts by weight. The ratio of adduct to solvent should be 100 parts by weight of adduct to 5 to 150 parts by weight of solvent, preferably 15 to 55 parts by weight. The temperature to be maintained during decomposition and separation into layers should be between 72 and 85° C.

It is advantageous to conduct the process continuously by using a vessel divided into two sections or a two vessel system. The second vessel is kept contantly filled, and its contents maintained at decomposition temperature. The contents of the first vessel are constantly agitated and also kept at decomposition temperature. Through one or more inlets being opened and closed periodically metered amounts of adduct, water, and solvent are fed into the first vessel. As the material is introduced corresponding amounts of the contents of the first vessel are displaced into the second vessel. In the second vessel there are two layers, the upper one comprises n-paraffin dissolved in the solvent, and the lower one comprises an aqueous urea solution. The individual layers are drawn off, periodically or continuously, at the top and at the bottom of the vessel, respectively. They are drawn off at a rate such that the pressure variations in the two vessel system caused by introducing feed to the first and drawing off the layers from the second vessel are practically negligible.

To maintain the pressure in the first vessel, a metering device comprising a compartmented rotor mounted in a casing may be employed to introduce the adduct, water and solvent. For reasons of corrosion resistance the rotor and the inner surface area of the casing are coated, preferably with polyfluorhydrocarbons.

The following examples illustrate the practice of invention.

Example I 133 parts by weight of urea-n-paraffin adduct granules were heated together with 20 parts by weight of dichloromethane in a closed vessel. The adduct granules comprised 64.5 parts by weight of adduct and 68.5 parts by weight of aqueous urea solution enclosed in the adduct. The adduct comprised 49.5 parts by weight of urea and 15.0 parts by weight of n-$C_{20}$-paraffin while the aqueous urea solution comprised 40.5 parts by weight of urea and 28.0 parts by weight of water. Thus, the adduct granules had a gross composition of 90 parts by weight of urea, 15 parts by weight of n-$C_{20}$-paraffin and 28 parts by weight of water.

When the temperature in the closed vessel reached 76° C. the adduct decomposed. This temperature was maintained for about 5 more minutes during which the mixture separated into two layers. 33 parts by weight were drawn off from the upper layer and 118 parts by weight from the lower layers. The upper layer was subjected to distillation resulting in the separation of 19 parts by weight of dichloromethane and 14 parts by weight of n-paraffin. The lower layer was used again for the production of more adducts. The adduct granules dervied therefrom had the same composition as those used in the first run. Thus the process described above was constantly repeated through a recycling of the urea solution. The loss of urea while recycling amounted to 0.4 percent in 24 hours.

Example II

The procedure of Example I was repeated but in an open vessel from which dichloromethane evaporated during the heating time. The decomposition did not start until a temperature of 92° C. was reached, and was completed at a temperature of 96° C. The loss of urea while recycling amounted to 6.5 percent in 24 hours.

Example III

The procedure of Example II was repeated with however a further addition of 18 parts by weight of water. In this case the decomposition also began at 76° C. and was completed at this temperature. However, the added water had to be removed by evaporation from the resultant aqueous urea solution before the solution could be used for further adduct formation.

We claim:

1. In a urea dewaxing process wherein a hydrocarbon mixture containing normal paraffins is admixed with an oil solvent producing an oil-solvent mixture, and wherein said oil-solvent mixture is contacted with a concentrated aqueous urea solution forming a solid adduct of normal paraffin and urea, said adduct having associated therewith an aqueous urea solution having a urea concentration substantially lower than that of the concentrated aqueous urea solution employed to form said adduct and wherein said adduct is separated from the liquid mixture prior to decomposition of said adduct, the improvement in adduct decomposition which comprises:
  (a) admixing said solid adduct with a solvent, said solvent being one which is a solvent for n-paraffins but which is immisible with water and which does not form an adduct with urea to a significant degree,
  (b) heating the mixture of adduct and solvent in a closed vessel to a temperature which effects decomposition of the adduct and evaporation of said solvent, and
  (c) maintaining said temperature until the adduct decomposes substantially completely and the vessel contents separate into a solvent layer and an aqueous layer, said aqueous layer having substantially the same urea content as the concentrated urea solution used for preparing said adduct.

2. A process according to claim 1 wherein the solvent is selected from the group consisting of low molecular weight aliphatic branched chain alcohols, cyclic alcohols, ethers, ketones, hydrocarbons and aliphatic chlorides.

3. A process according to claim 2 wherein the group is isohexanol, cyclohexanol, diethylether, butanone, isopentane, isohexane, dichloromethane and dichloroethane.

4. A process according to claim 1 wherein the solvent is selected from the group consisting of benzene and methylcyclopentane.

5. A process according to claim 1 wherein the mixture of step (b) is agitated.

6. A process according to claim 1 including the following additional steps:
  (d) following the separation into layers, withdrawing a first layer comprising n-paraffin and solvent and a second layer comprising an aqueous solution of urea, and
  (e) recovering said n-paraffin from said first layer.

7. A process according to claim 6 wherein the solvent is selected from the group consisting of isopentane, isohexane, dichloromethane and dichloroethane.

References Cited
UNITED STATES PATENTS

| | | | |
|---|---|---|---|
| 3,071,534 | 1/1963 | Hoppe et al. | 208—25 |
| 2,862,868 | 12/1958 | Brown et al. | 208—25 |
| 2,823,172 | 2/1958 | Rumberger et al. | 208—25 |
| 2,731,455 | 1/1956 | Salzmann et al. | 208—25 |
| 2,779,710 | 1/1957 | Phillips et al. | 260—96.5 C |
| 2,861,941 | 11/1958 | Jancosek et al. | 208—25 |
| 3,108,942 | 10/1963 | Silva et al. | 208—25 |

DANIEL E. WYMAN, Primary Examiner

H. M. S. SNEED, Assistant Examiner

U.S. Cl. X.R.

260—96.5 R, 96.5 C